United States Patent
Matsumoto et al.

(10) Patent No.: US 7,225,669 B2
(45) Date of Patent: *Jun. 5, 2007

(54) HEATING RESISTANCE FLOW RATE MEASURING APPARATUS

(75) Inventors: Masahiro Matsumoto, Chiyoda-ku (JP); Masamichi Yamada, Chiyoda-ku (JP); Hiroshi Nakano, Chiyoda-ku (JP); Izumi Watanabe, Hitachinaka (JP); Keiji Hanzawa, Hitachinaka (JP); Keiichi Nakada, Chiyoda-ku (JP)

(73) Assignees: Hitachi, Ltd., Tokyo (JP); Hitachi Car Engineering Co., Ltd., Hitachinaka-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/283,778

(22) Filed: Nov. 22, 2005

(65) Prior Publication Data

US 2006/0070436 A1 Apr. 6, 2006

Related U.S. Application Data

(63) Continuation of application No. 11/052,754, filed on Feb. 9, 2005, now Pat. No. 6,973,826.

(30) Foreign Application Priority Data

Mar. 30, 2004 (JP) ............................... 2004-98647

(51) Int. Cl.
*G01F 1/68* (2006.01)

(52) U.S. Cl. .................................. 73/204.15

(58) Field of Classification Search ............. 73/204.15, 73/204.26, 204.16, 204.17, 204.19, 204.25, 73/204.23; 374/29, 31, 43

See application file for complete search history.

(56) References Cited

U.S. PATENT DOCUMENTS

| | | | |
|---|---|---|---|
| 6,032,525 A | 3/2000 | Suetake | |
| 6,349,596 B1 | 2/2002 | Nakada et al. | |
| 6,763,711 B1 | 7/2004 | Nair et al. | |
| 6,786,088 B2 | 9/2004 | Matsumura | |
| 6,973,826 B2 * | 12/2005 | Matsumoto et al. | 73/204.15 |

FOREIGN PATENT DOCUMENTS

JP 2002-48616 2/2002

\* cited by examiner

*Primary Examiner*—Jewel Thompson
(74) *Attorney, Agent, or Firm*—Crowell & Moring LLP

(57) ABSTRACT

A heating resistance flow rate measuring apparatus which can use a power source of an ECU in an automobile without requiring an expensive protective circuit and regulator. Heating of temperature detecting resistors themselves causes temperature changes on the windward and leeward sides, and these temperature changes depend on the amounts of heat generated by the temperature detecting resistors. The amounts of heat generated by the temperature detecting resistors depend on a voltage value of the ECU power source applied to the temperature detecting resistors, and an error is caused in a sensor output depending on a variation in the voltage of the ECU power source. Based on the finding that suppressing the amount of heat generated by the temperature detecting resistors is effective in avoiding the sensor output error caused depending on a variation in the output voltage of the ECU power source, means for suppressing the amount of heat generated by the temperature detecting resistors is disposed.

10 Claims, 14 Drawing Sheets

HEATING RESISTANCE FLOW RATE MEASURING APPARATUS

CROSS-REFERENCE TO RELATED APPLICATION

This application is a Continuation application of U.S. application Ser. No. 11/052,754, filed Feb. 9, 2005 now U.S. Pat. No. 6,973,826, which is incorporated by reference herein.

BACKGROUND OF THE INVENTION

1. Field of the Invention

The present invention relates to a heating resistance flow rate measuring apparatus, and more particularly to a heating resistance flow rate measuring apparatus for measuring the flow rate of a fluid based on a detected temperature difference between temperature detecting resistors disposed on both sides of a heating resistor.

2. Description of the Related Art

One type of known heating resistance flow rate measuring apparatus comprises a heating resistor and temperature detecting resistors disposed respectively upstream and downstream of the heating resistor in the flowing direction of a fluid. The flow rate of the fluid is determined by measuring a temperature difference between the temperature detecting resistors on the upstream and downstream sides.

As one example of that type of heating resistance flow rate measuring apparatus, there is a thermal type airflow sensor disclosed in Patent Reference 1; JP,A 2002-48616.

SUMMARY OF THE INVENTION

In the known heating resistance flow rate measuring apparatus comprising the heating resistor and the temperature detecting resistors disposed on both the sides of the heating resistor, a battery is employed as a power source, for example, when the flow rate measuring apparatus is mounted in an automobile.

On the other hand, a pressure sensor and the like used in an automobile are generally supplied with ECU power source, i.e., power source from an ECU (Engine Control Unit), instead of power from the battery.

The reason why the pressure sensor and the like are supplied with the power source from the ECU resides in that, because the voltage of the ECU power source is about 5 V, requirements for specifications of electric noise, overvoltage, etc. can be set to lower voltage levels and a protective circuit necessary for meeting the requirements can be formed by using parts that are endurable against relatively low voltages, thus resulting in reduction of the cost.

In other words, when the power is supplied from the battery instead of the ECU power source, requirements for specifications of electric noise, overvoltage, etc. are severer and parts endurable against relatively high voltages are required for protection of the pressure sensor and the like.

For the heating resistance flow rate measuring apparatus, the power is supplied from the battery instead of the ECU power source because the power consumption of the flow rate measuring apparatus is large.

Modifying the heating resistance flow rate measuring apparatus to be capable of being supplied with the power source from the ECU instead of the battery seems possible just by reducing the power consumption. When receiving the power source supplied from the ECU, however, the voltage of the power source is required to be held in the range of 4.5 to 5.5 V for operation of the flow rate measuring apparatus, and the current thereof is also limited to ten and several mA. Further, the output voltage of the flow rate measuring apparatus must be in proportion to the voltage value of the ECU power source.

For that reason, an expensive protective circuit and regulator are required, and the overall cost of the device is pushed up.

Accordingly, it is an object of the present invention to realize a heating resistance flow rate measuring apparatus which can use a power source of an ECU in an automobile without requiring an expensive protective circuit and regulator.

To achieve the above object, the present invention is constructed as follows.

In a heating resistance flow rate measuring apparatus comprising a heating resistor and temperature detecting resistors disposed respectively upstream and downstream of the heating resistor in the flowing direction of a fluid, a heating suppressing unit for suppressing heating of the temperature detecting resistors is disposed.

When the temperature detecting resistors are directly connected to power source, the amounts of heat generated by the temperature detecting resistors are changed depending on a change in voltage value of the power source, and the temperatures of the temperature detecting resistors themselves are also changed. Accordingly, an output voltage of the heating resistance flow rate measuring apparatus becomes not proportional to the voltage value of the power source.

Based on that finding, the heating suppressing unit for suppressing heating of the temperature detecting resistors is disposed to make the output voltage of the heating resistance flow rate measuring apparatus substantially proportional to the voltage value of the power source.

One preferable example of the heating suppressing unit for the temperature detecting resistors is to set a resistance value of the temperature detecting resistors to a high value in the range of 5 k$\Omega$ to 500 k$\Omega$. Another preferable example of the heating suppressing unit is a Peltier device serving as a device for cooling the temperature detecting resistor. Still another preferable example of the heating suppressing unit is a unit for intermittently supplying a current to the temperature detecting resistors.

Further, the larger the resistance temperature coefficient of the heating resistor, the larger is a variation in resistance value of the heating resistor. On the other hand, if the resistance temperature coefficient of the heating resistor were too small, it would be difficult to detect the temperature of the heating resistor. In addition, the temperature of the heating resistor is required to be increased to a level not lower than a certain temperature with the view of ensuring the function of removing contaminants. For those reasons, the resistance temperature coefficient of the heating resistor is preferably in the range of 1000 ppm/° C. to 2000 ppm/° C.

Thus, according to the present invention, it is possible to realize a heating resistance flow rate measuring apparatus which can use a power source of an ECU in an automobile without requiring an expensive protective circuit and regulator.

DESCRIPTION OF THE PREFERRED EMBODIMENTS

Embodiments of the present invention will be described below with reference to the drawings.

Figure 1:
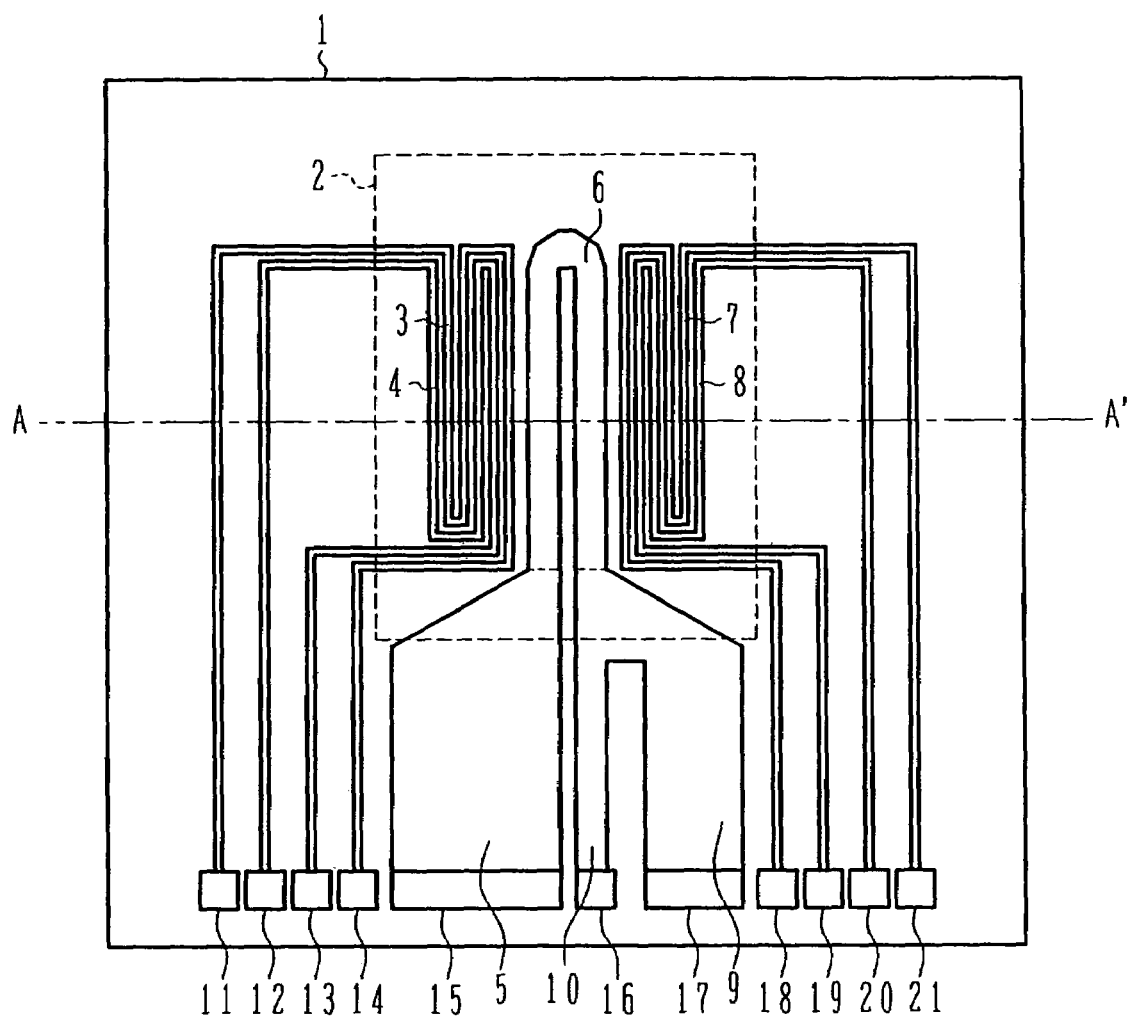
FIG. 1 is a plan view of a sensor element of a heating resistance flow rate measuring apparatus according to a first embodiment of the present invention.
Figure 2:
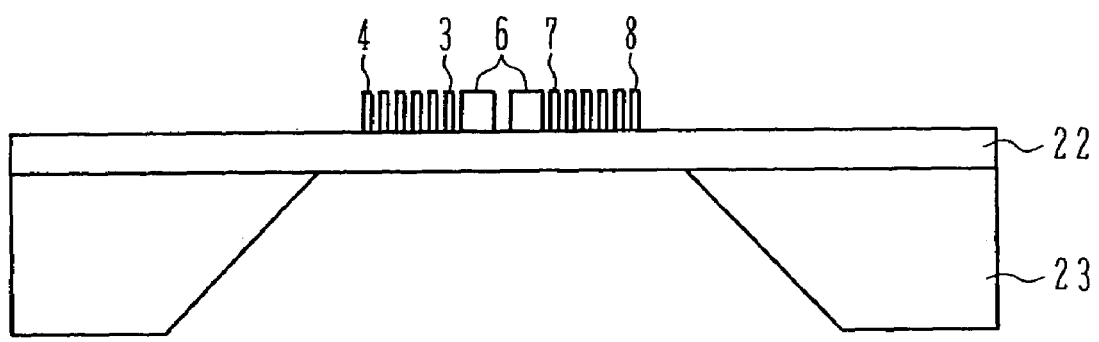
FIG. 2 is a sectional view taken along the line A-A' in FIG. 1.
Figure 3:
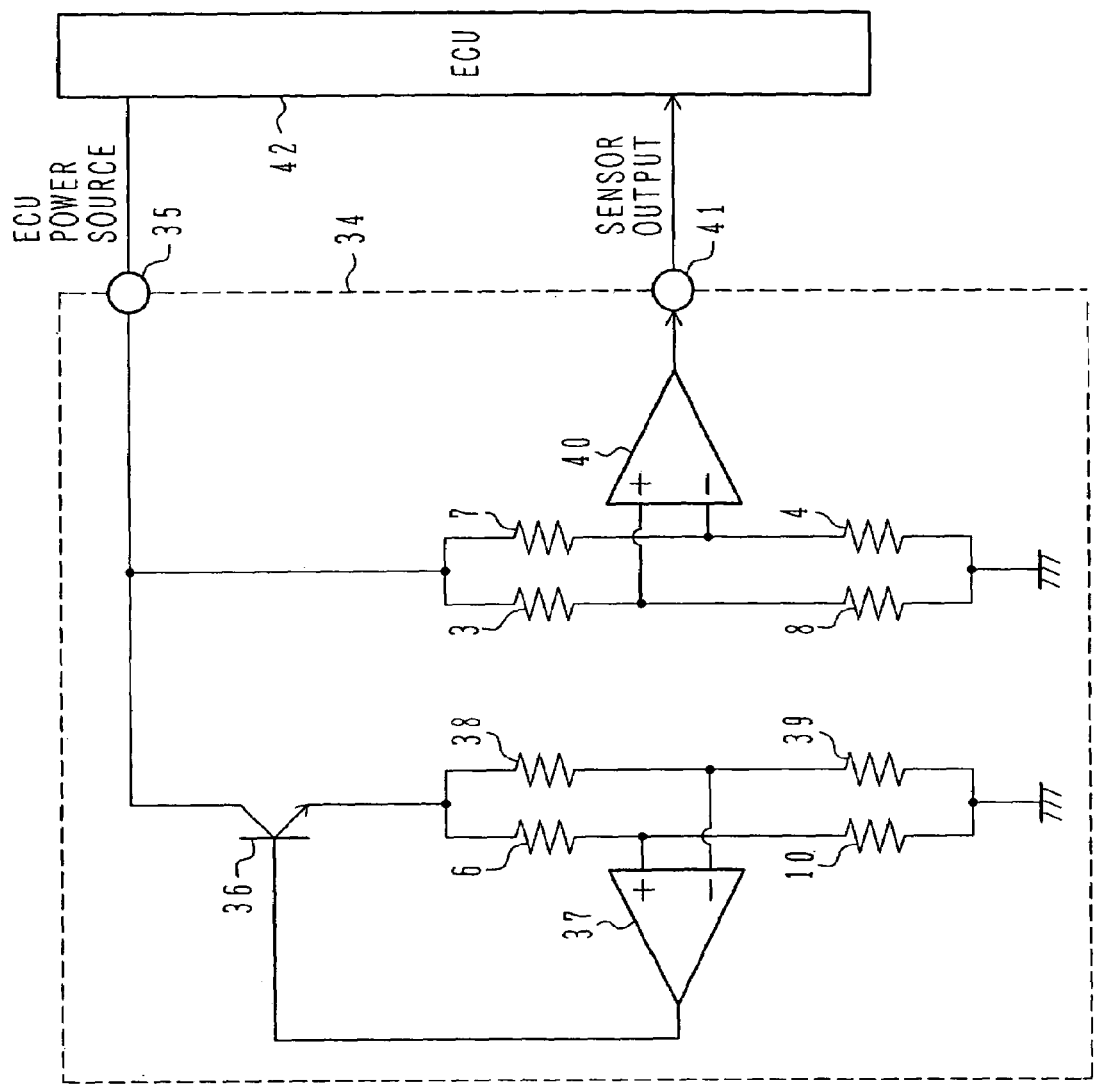
FIG. 3 is a diagram of a driving circuit of the heating resistance flow rate measuring apparatus according to the first embodiment.
Figure 4:
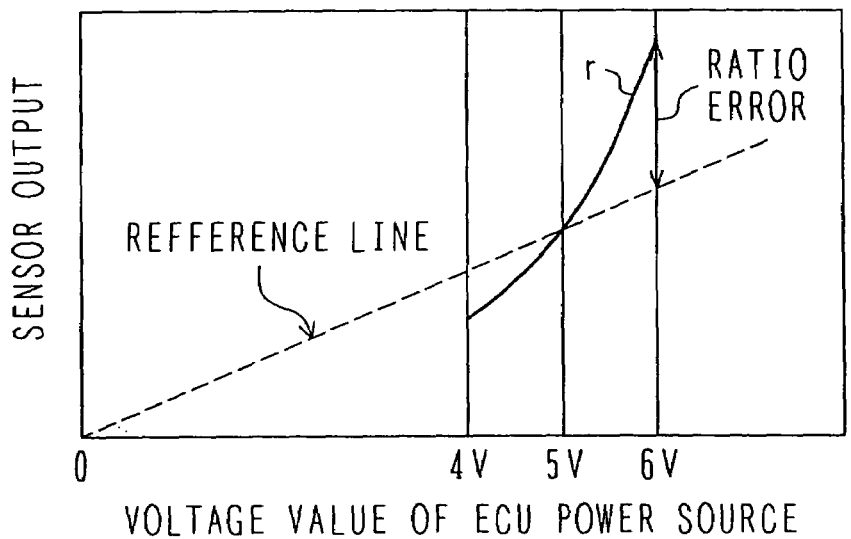
FIG. 4 is a graph showing the relationship between a voltage value of ECU power source and a sensor output.

First, a heating resistance flow rate measuring apparatus according to a first embodiment of the present invention will be described with reference to FIGS. 1 to 12. Of these drawings, FIG. 1 is a plan view of a sensor element 1 of the heating resistance flow rate measuring apparatus according to the first embodiment of the present invention, and FIG. 2 is a sectional view taken along the line A-A' in FIG. 1. FIG. 3 is a diagram of a driving circuit of the heating resistance flow rate measuring apparatus according to the first embodiment, and FIG. 4 is a graph showing the relationship between a voltage value of ECU power source and a sensor output.

Figure 5:
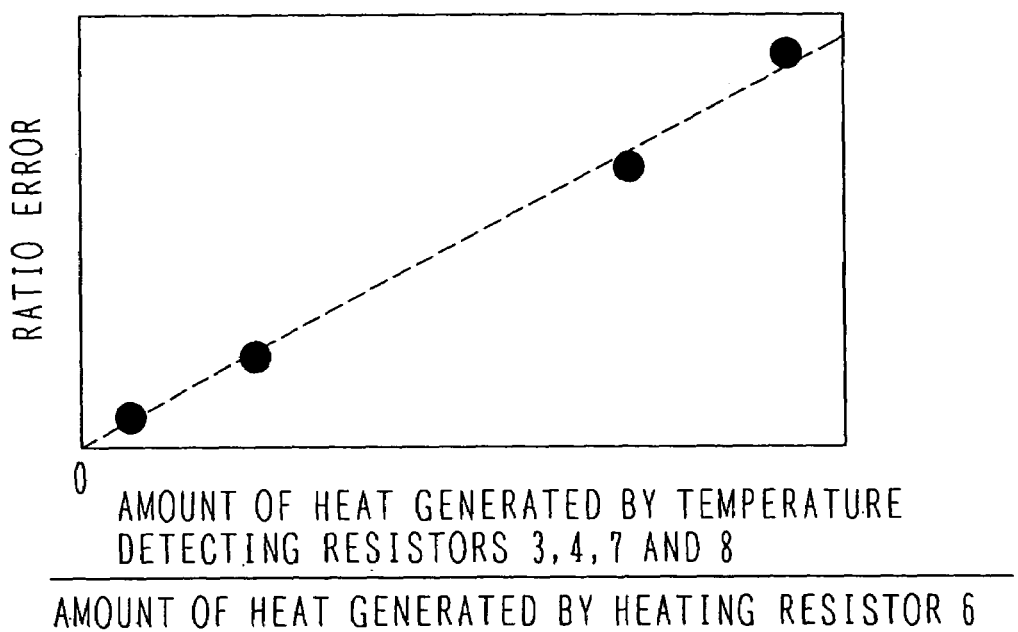
FIG. 5 is a graph showing the relationship between a ratio of the amount of heat generated by temperature detecting resistors to the amount of heat generated by a heating resistor and a ratio error.
Figure 6:
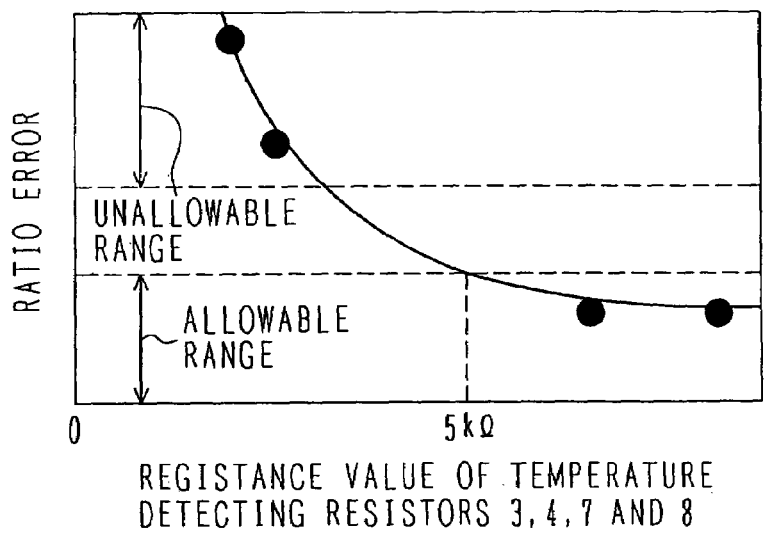
FIG. 6 is a graph showing the relationship between a resistance value of the temperature detecting resistors and the ratio error.
Figure 7:
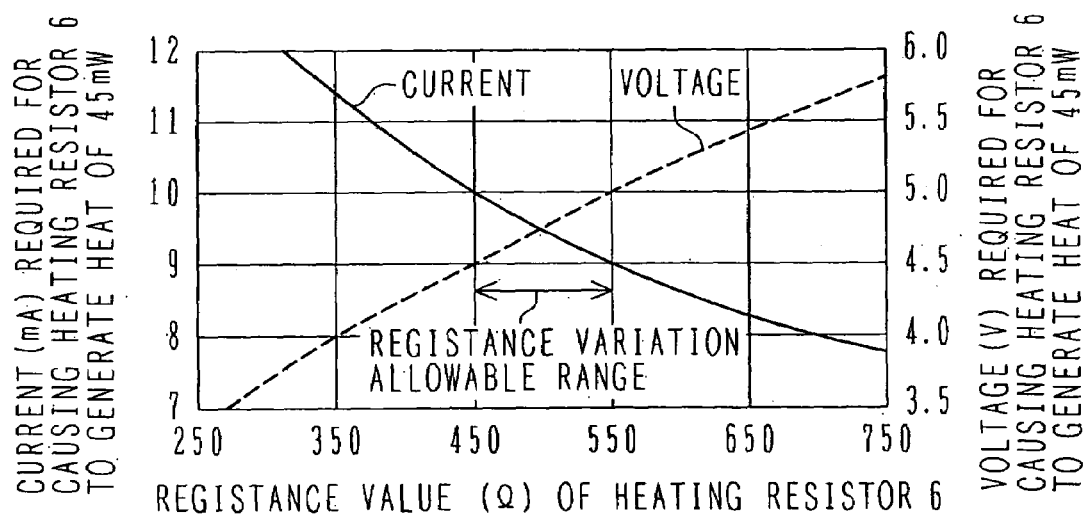
FIG. 7 is a graph showing the relationship of a resistance value of the heating resistor versus a current and a voltage which are required for causing the heating resistor to generate heat of 45 mW.

FIG. 5 is a graph showing the relationship between a ratio of the amount of heat generated by temperature detecting resistors 3, 4, 7 and 8 to the amount of heat generated by a heating resistor 6 and a ratio error, FIG. 6 is a graph showing the relationship between a resistance value of the temperature detecting resistors 3, 4, 7 and 8 and the ratio error, and FIG. 7 is a graph showing the relationship of a resistance value of the heating resistor 6 versus a current and a voltage which are required for causing the heating resistor 6 to generate heat of 45 mW.

Figure 8:
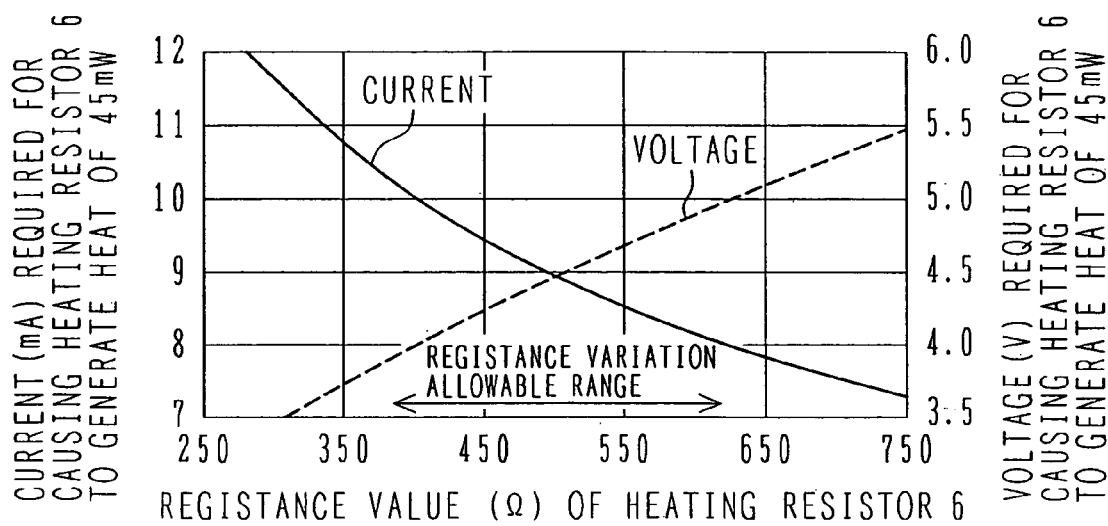
FIG. 8 is a graph showing the relationship of a resistance value of the heating resistor versus a current and a voltage which are required for causing the heating resistor to generate heat of 40 mW.
Figure 9:
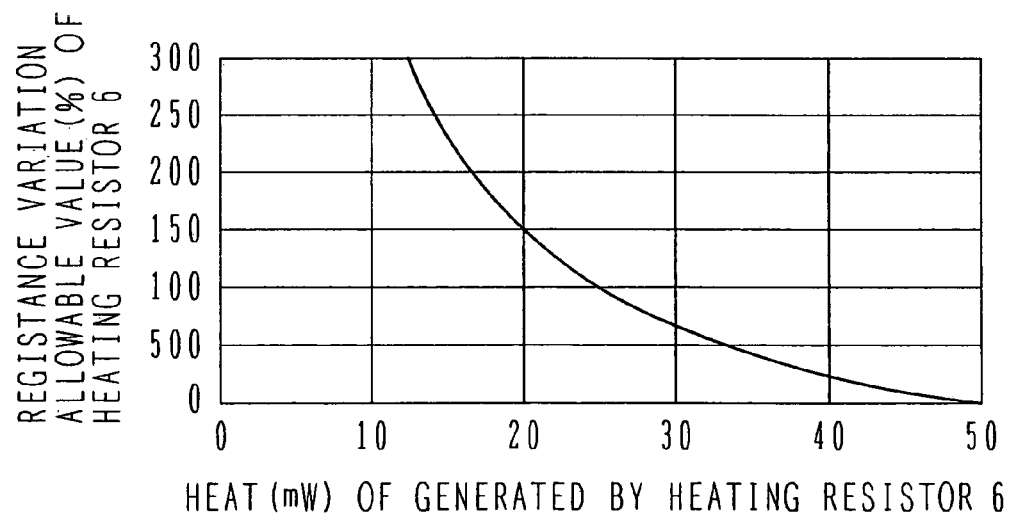
FIG. 9 is a graph showing the relationship between the amount of heat generated by the heating resistor and a resistance variation allowable value of the heating resistor.
Figure 10:
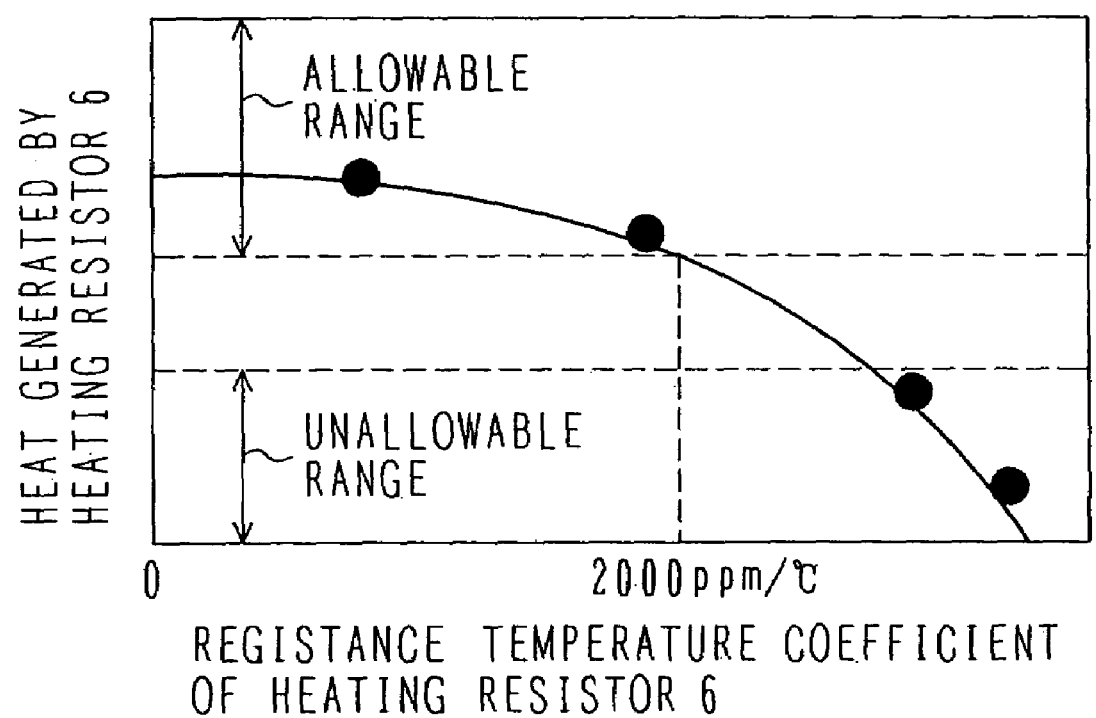
FIG. 10 is a graph showing the relationship between the resistance temperature coefficient of the heating resistor and the amount of heat generated by the heating resistor.
Figure 11:
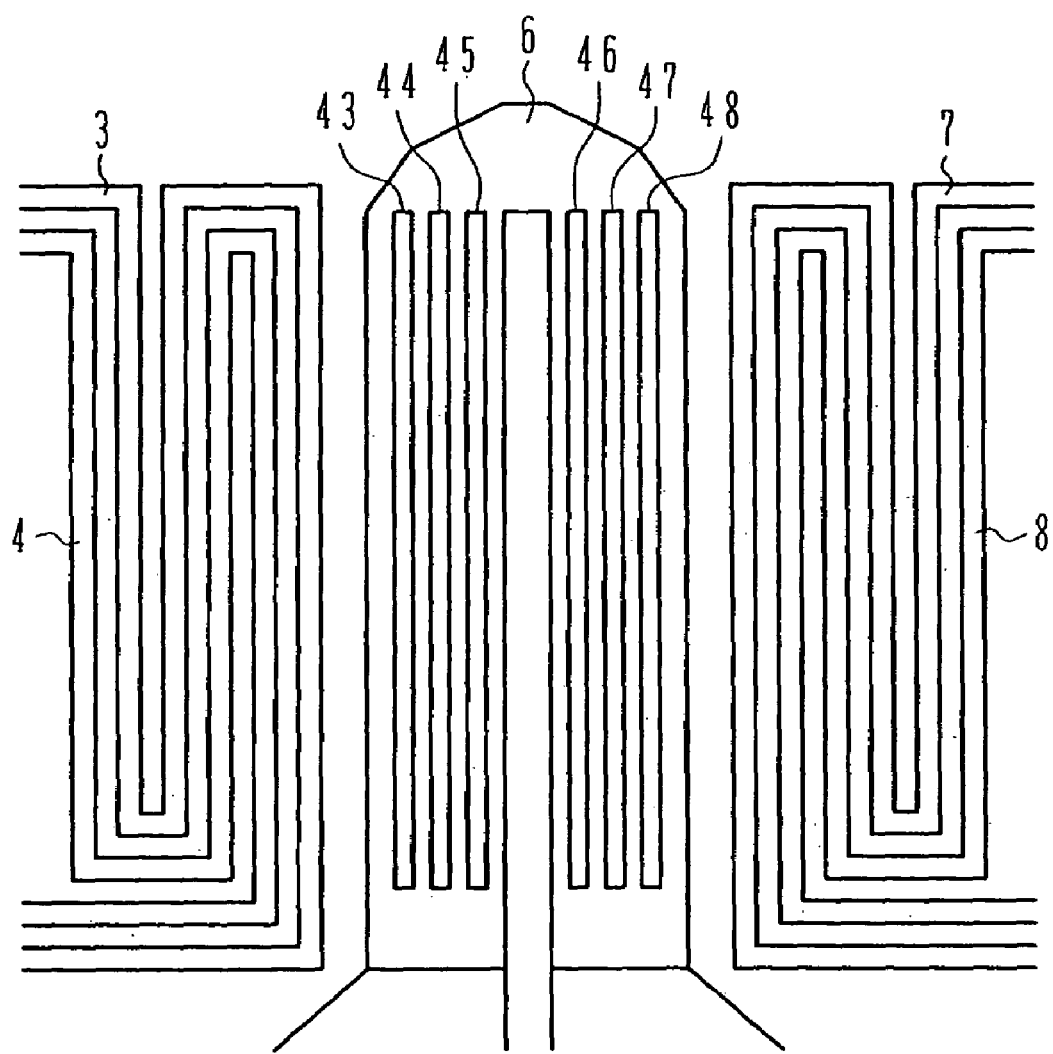
FIG. 11 is an enlarged view of the heating resistor and the temperature detecting resistors.
Figure 12:
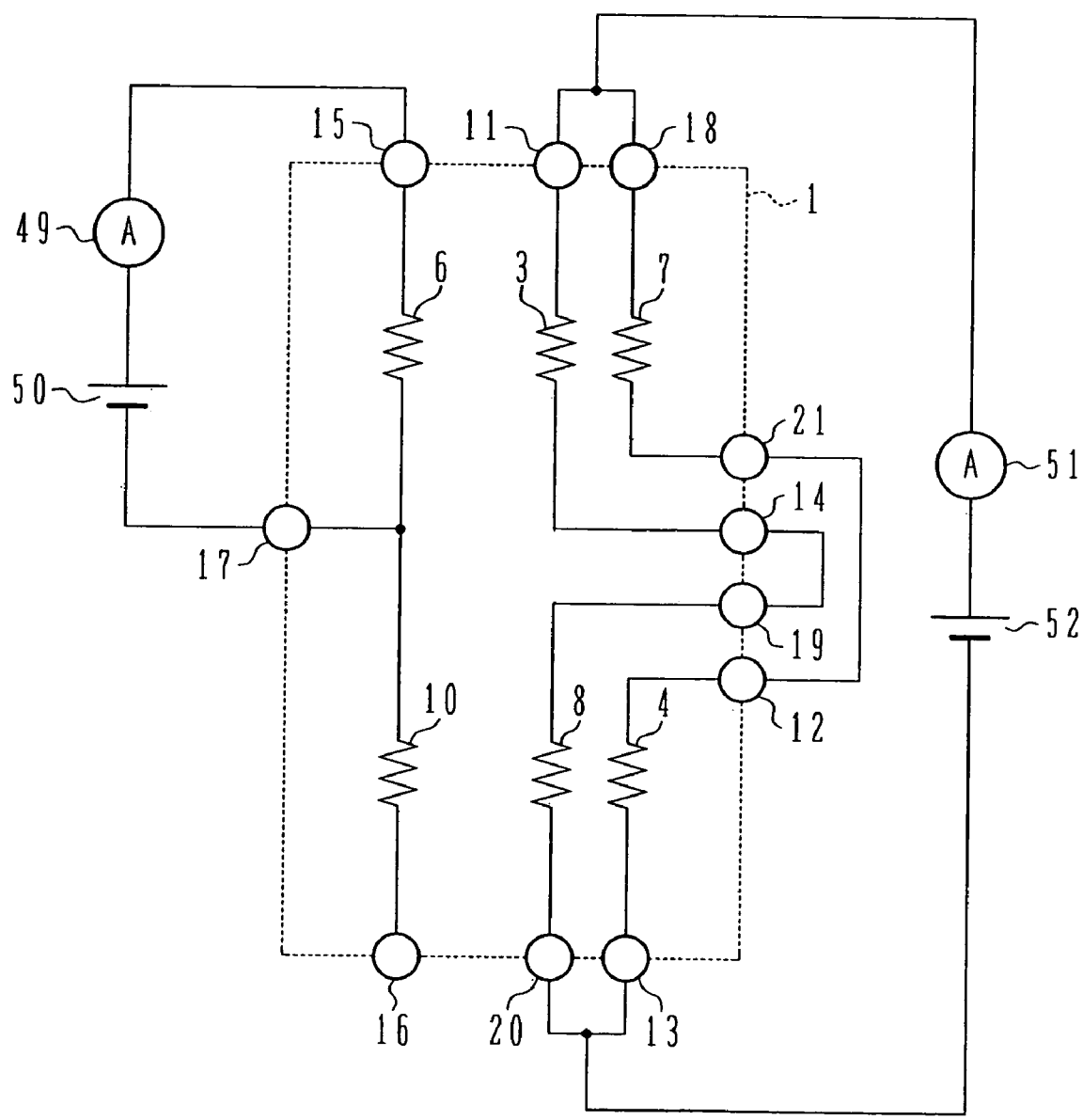
FIG. 12 is a circuit diagram for measuring the resistance value of the heating resistor and the resistance value of the temperature detecting resistors.
Figure 17:
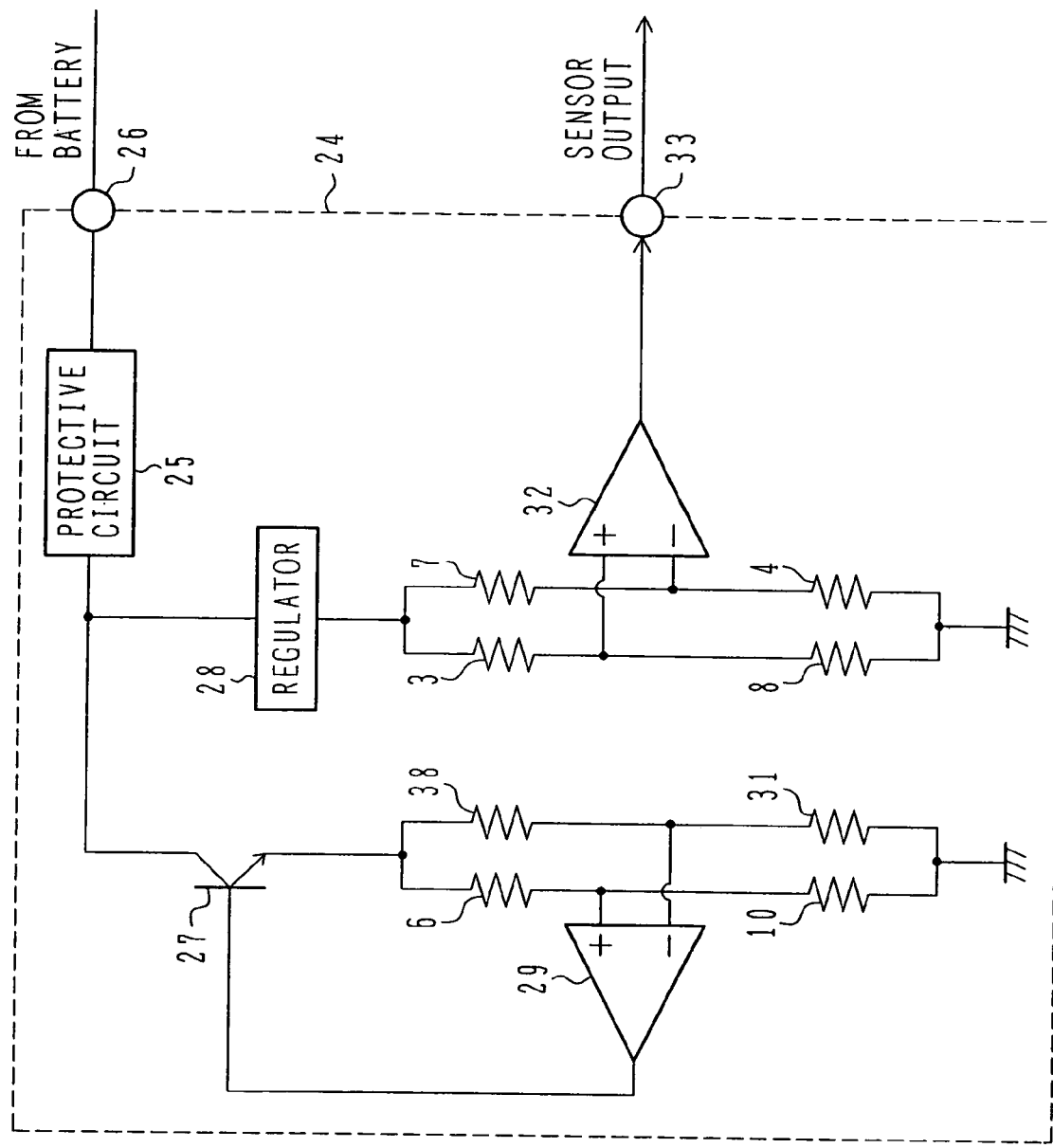
FIG. 17 is a diagram of a driving circuit of a known heating resistance flow rate measuring apparatus, which is supplied with power from a battery unlike the present invention.

FIG. 8 is a graph showing the relationship of a resistance value of the heating resistor 6 versus a current and a voltage which are required for causing the heating resistor 6 to generate heat of 40 mW, and FIG. 9 is a graph showing the relationship between the amount of heat generated by the heating resistor 6 and a resistance variation allowable value of the heating resistor 6. FIG. 10 is a graph showing the relationship between the resistance temperature coefficient of the heating resistor 6 and the amount of heat generated by the heating resistor 6, FIG. 11 is an enlarged view of the heating resistor 6 and the temperature detecting resistors 3, 4, 7 and 8, and FIG. 12 is a circuit diagram for measuring the resistance value of the heating resistor 6 and the resistance value of the temperature detecting resistors 3, 4, 7 and 8. Additionally, for comparison with the present invention, FIG. 17 shows a driving circuit of a known heating resistance flow rate measuring apparatus, which is supplied with power from a battery unlike the present invention.

The construction of the sensor element 1 of the heating resistance flow rate measuring apparatus according to the first embodiment of the present invention will be described with reference to FIGS. 1 and 2.

In FIGS. 1 and 2, a flat substrate 23 of the sensor element 1 is made of a material having a high thermal conductivity, such as silicon and ceramic. After forming an insulating film 22 on the flat substrate 23, the flat substrate 23 is etched away from its rear side to form a cavity below the insulating film 22. A thin wall portion (diaphragm) 2 is thereby formed in the flat substrate 23.

On the surface of the thin wall portion 2, there are formed a heating resistor 6 which is heated so as to hold a certain temperature difference with respect to the temperature of airflow to be measured, and temperature detecting resistors 3, 4, 7 and 8 disposed on both sides of the heating resistor 6. The heating resistor 6 is a resistor made of, for example, a polysilicon thin film, a platinum thin film, or a nickel alloy thin film. The heating resistor 6 generates heat when a current is supplied to flow through it, and has a resistance value changed depending on the temperature thereof.

Similarly, the temperature detecting resistors 3, 4, 7 and 8 are each a resistor made of, for example, a polysilicon thin film, a platinum thin film, or a nickel alloy thin film, and has a resistance value changed depending on the temperature thereof.

Thus, in the heating resistance flow rate measuring apparatus having the above-described arrangement, the heating resistor 6 is heated such that a certain temperature difference is held with respect to the temperature of airflow to be measured. When air flows through the heating resistance flow rate measuring apparatus, the temperature on the windward (upstream) side of the heating resistor 6 lowers, while the temperature on the leeward (downstream) side of the heating resistor 6 rises. In consideration of such a phenomenon, the flow rate of the air is measured by detecting a resulting temperature change with the temperature detecting resistors 3, 4, 7 and 8.

Additionally, based on the fact that the temperature of the flat substrate 23 is changed depending on the ambient temperature, the ambient temperature is detected by a temperature measuring resistor 10 which is also disposed on the flat substrate 23.

Further, by detecting the ambient temperature in accordance with the information obtained from the temperature measuring resistor 10, the temperature of the heating resistor 6 is controlled so that a certain temperature difference is held with respect to the ambient temperature. The temperature measuring resistor 10 is a resistor made of, for example, a polysilicon thin film, a platinum thin film, or a nickel alloy thin film, and serves to measure the ambient temperature by utilizing the fact that its resistance value is changed depending on the temperature thereof.

The heating resistor 6, the temperature detecting resistors 3, 4, 7 and 8, and the temperature measuring resistor 10 are connected to pads 11, 12, 13, 14, 15, 16, 17, 18, 19, 20 and 21 for allowing the wiring to be led out to the exterior.

The heating resistor 6 and the temperature measuring resistor 10 are connected in series through a wiring pattern 9 formed on the flat substrate 23, and a junction between the heating resistor 6 and the temperature measuring resistor 10 is connected to the pad 17 through the wiring pattern 9. Moreover, the heating resistor 6 is connected to the pad 15 through a wiring pattern 5.

Next, the arrangement of a driving circuit of a known heating resistance flow rate measuring apparatus, which is supplied with power from a battery unlike the present invention, will be described with reference to FIG. 17 for the purpose of comparison.

As shown in FIG. 17, a driving circuit 24 receiving power source from a battery comprises a power source terminal 26 to which the power source is supplied from the battery, and a protective circuit 25 for protecting the driving circuit 24 against electric noise and overvoltage of the power source supplied from the battery. The driving circuit 24 further comprises a heating resistor 6 and a temperature measuring resistor 10 both disposed within a sensor element similar to that denoted by 1 in FIG. 1, a driving transistor 27 for energizing the heating resistor 6, resistances 30, 31 connected in parallel to a circuit made up of the heating resistor 6 and the temperature measuring resistor 10 connected in series, and an amplifier 29 for amplifying an error voltage of a bridge circuit made of the heating resistor 6, the temperature measuring resistor 10, and the resistances 30, 31 and energizing the driving transistor 27.

Still further, the driving circuit 24 comprises a regulator 28 for generating a constant voltage from an output of the protective circuit 25 and supplying the constant voltage to temperature detecting resistors 3, 4, 7 and 8, an amplifier 32 for amplifying an output voltage of a bridge circuit made up of the temperature detecting resistors 3, 4, 7 and 8 to generate a sensor output, and a sensor output terminal 33 for outputting the sensor output to the exterior.

In the driving circuit 24 thus arranged, because the power source is supplied from the battery, there are substantially no restrictions on the power, and significant problems are not caused even if the driving circuit 24 consumes a current on the order of several amperes. Furthermore, with the provision of the regulator 28 in the driving circuit 24, variations hardly occur in the voltage applied to the temperature detecting resistors 3, 4, 7 and 8.

Next, the arrangement of a driving circuit of the heating resistance flow rate measuring apparatus according to the first embodiment of the present invention will be described with reference to FIG. 3.

As shown in FIG. 3, a driving circuit 34 according to the first embodiment of the present invention comprises a power source terminal 35 to which ECU power source is supplied from an ECU 42, the heating resistor 6 and the temperature measuring resistor 10 both disposed within the sensor element 1, a driving transistor 36 for energizing the heating resistor 6, resistances 38, 39 connected in parallel to a circuit made up of the heating resistor 6 and the temperature measuring resistor 10 connected in series, and an amplifier 37 for amplifying an error voltage of a bridge circuit made of the heating resistor 6, the temperature measuring resistor 10, and the resistances 38, 39 and energizing the driving transistor 36.

The driving circuit 34 further comprises an amplifier 40 for amplifying an output voltage of a bridge circuit made up of the temperature detecting resistors 3, 4, 7 and 8 to generate a sensor output, and a sensor output terminal 41 for outputting the sensor output to the exterior.

In the driving circuit 34 thus arranged, because the power source is supplied as the ECU power source from the ECU 42, there are various restrictions on the power.

First, the voltage value is about 5 V, the minimum operation assurance voltage is required to be 4.5 V, and the current is limited to about 10 mA. Further, because the voltage value of the ECU power source varies for each ECU used in practice, the sensor output is required to be in proportion to the voltage value of the ECU power source as indicated by a reference line in FIG. 4.

On the other hand, since the voltage value of the ECU power source is as low as about 5 V, neither the protective circuit 25 adapted for a relatively high-voltage level, nor the regulator 28 are necessary unlike the case of receiving the power from the battery as shown in FIG. 17. Therefore, the use of the ECU power source is very effective in reducing the cost of the heating resistance flow rate measuring apparatus.

For that reason, as described above, it has become more popular to utilize the ECU power source supplied from the ECU for a pressure sensor and a temperature sensor used in an automobile. However, because the current consumption of the heating resistance flow rate measuring apparatus is large, there has been a difficulty in utilizing the ECU power source for the flow rate measuring apparatus.

In particular, a hot-wire flow rate measuring apparatus has a difficulty in reducing power consumption of a heating resistor, and the ECU power source has been kept from being employed for the hot-wire flow rate measuring apparatus.

Meanwhile, in a heating resistance flow rate measuring apparatus of the type that a diaphragm is formed in a semiconductor substrate, e.g., a silicon substrate, and a heating resistor is formed on the diaphragm, like the above-described heating resistance flow rate measuring apparatus disclosed in Patent Reference 1, the size of the heating resistor can be reduced.

The size reduction of the heating resistor contributes to reducing heat capacity of the heating resistor and hence to realizing smaller power consumption. From this point of view, it seems possible to employ the ECU power source, which supplies lower power than the battery, in the heating resistance flow rate measuring apparatus as well.

However, other various problems in addition to the power consumption must be overcome to realize practical use of the ECU power source in the heating resistance flow rate measuring apparatus. Those problems and countermeasures will be described below.

When the ECU power source is employed for supply of the power to the heating resistance flow rate measuring apparatus, the flow rate measuring apparatus is required to have a characteristic, as shown in FIG. 4, that the sensor output is in proportion to the voltage value of the ECU power source (such a characteristic is defined here as a ratiometric characteristic).

In the driving circuit 34 shown in FIG. 3, therefore, the ECU power source is connected to supply the power for the bridge circuit made up of the temperature detecting resistors 3, 4, 7 and 8 so that the output voltage of the bridge circuit made up of the temperature detecting resistors 3, 4, 7 and 8 is in proportion to the voltage value of the ECU power source.

In the actual circuit, however, the sensor output is not in proportion to the voltage value of the ECU power source as indicated by a thick solid line r in FIG. 4, and a voltage error generates relative to the output voltage (indicated by the reference line) that is in proportion to the voltage value of the ECU power source. Such a voltage error is defined here as a ratio error. As a result of experiments made by the inventors, it has been found that, as shown in FIG. 5, the ratio error is in proportion to a ratio of the amount of heat generated by the temperature detecting resistors 3, 4, 7 and 8 to the amount of heat generated by the heating resistor 6.

Further, the inventors have confirmed that the above-mentioned result is attributable to the fact that, since the temperature detecting resistors 3, 4, 7 and 8 disposed upstream and downstream of the heating resistor 6 are directly connected to the ECU power source, the amount of heat generated by temperature detecting resistors 3, 4, 7 and 8 is changed depending on a change in the voltage value of the ECU power source, and the temperatures of the temperature detecting resistors 3, 4, 7 and 8 themselves are also changed correspondingly.

In the heating resistance flow rate measuring apparatus, as described above, the heating resistor 6 is heated such that a certain temperature difference is held with respect to the ambient temperature. When there occurs a wind (flow of air as a fluid) in the heating resistance flow rate measuring apparatus, the temperature on the windward (upstream) side of the heating resistor 6 lowers, while the temperature on the leeward (downstream) side of the heating resistor 6 rises. In consideration of such a phenomenon, the above temperature change is measured by detecting resistance changes of the temperature detecting resistors 3, 4, 7 and 8.

The heating of the temperature detecting resistors 3, 4, 7 and 8 themselves causes temperature changes on the windward and leeward sides, and these temperature changes depend on the amounts of heat generated by the temperature detecting resistors 3, 4, 7 and 8. Then, the amounts of heat generated by the temperature detecting resistors 3, 4, 7 and 8 depend on the voltage applied to the temperature detecting resistors 3, 4, 7 and 8, i.e., the voltage value of the ECU power source.

Thus, it is deemed that, corresponding to a variation in the voltage value of the ECU power source, an error occurs in the sensor output, whereby the ratio error is generated.

To prevent the sensor output error caused by a variation in the voltage value of the power source, the known heating resistance flow rate measuring apparatus employs the regulator 28 as shown in FIG. 17.

In this embodiment of the present invention in which the power source is supplied from the ECU, however, the ECU power source must be directly connected to the bridge circuit made up of the temperature detecting resistors 3, 4, 7 and 8 in order to obtain the ratiometric characteristic.

Taking into account the above, in the present invention, the amount of heat generated by the temperature detecting resistors 3, 4, 7 and 8 is suppressed to avoid the sensor output error caused by a variation in the voltage value of the ECU power source in the arrangement where the ECU power source is directly connected to the bridge circuit, without inviting a substantial increase in cost.

A practically conceivable means for suppressing the amount of heat generated by the temperature detecting resistors 3, 4, 7 and 8 is to reduce the amount of heat generated by the temperature detecting resistors 3, 4, 7 and 8 in itself, or to cool the temperature detecting resistors 3, 4, 7 and 8.

One example of the means for reducing the amount of heat generated by the temperature detecting resistors 3, 4, 7 and 8 in itself is to increase the resistance value of the temperature detecting resistors 3, 4, 7 and 8.

The example of increasing the resistance value of the temperature detecting resistors 3, 4, 7 and 8 will be described below.

FIG. 6 is a graph showing the result of experiments made on the relationship between the resistance value of the temperature detecting resistors 3, 4, 7 and 8 and the ratio error.

As seen from FIG. 6, the ratio error can be held within the allowable range by setting the resistance value of the temperature detecting resistors 3, 4, 7 and 8 to be not smaller than 5 kΩ. This is presumably resulted from the fact that the increased resistance value of the temperature detecting resistors 3, 4, 7 and 8 reduces the amount of heat generated by the temperature detecting resistors 3, 4, 7 and 8 and hence contributes to realizing a reduction of the ratio error.

As shown in FIG. 5, the ratio error depends on the ratio of the amount of heat generated by the temperature detecting resistors 3, 4, 7 and 8 to the amount of heat generated by the heating resistor 6. Then, when the driving circuit 34 is supplied with the power source from the ECU as in the present invention, the amount of heat generated by the heating resistor 6 is limited to about 40 mW because of restrictions on the voltage and current of the ECU power source. Further, the voltage of the ECU power source is fixed to about 5 V, and therefore the amount of heat generated by the temperature detecting resistors 3, 4, 7 and 8 depends on the resistance value of the temperature detecting resistors 3, 4, 7 and 8.

From the restrictive conditions described above, in the case using the ECU power source, the resistance value of the temperature detecting resistors 3, 4, 7 and 8 is essentially required to be not smaller than 5 kΩ. A preferable upper limit is 500 kΩ or more in consideration of the influence of input impedance of the amplifier 40. In practical use, a sufficient effect is expected with the resistance value in the range of 5 kΩ to 500 kΩ because the ratio error can be held within the allowable range by using the resistance value in that range.

Also, corresponding to the limitation on the amount of heat generated by the heating resistor 6, the heating resistor 6 is required to have a smaller area. When the amount of heat generated by the heating resistor 6 is set to 40 mW, for example, the area of the heating resistor 6 must be 0.1 mm$^2$ or less.

In other words, the heating resistor 6 must be sized such that the length is not more than 500 μm and the width is not more than 200 μm. As the area of the heating resistor 6 reduces, the area in which the temperature detecting resistors 3, 4, 7 and 8 are to be disposed is also reduced (namely, a region where temperature is changed with airflow is a very limited one around the heating resistor 6, and the temperature detecting resistors 3, 4, 7 and 8 must be disposed in such a region). For that reason, if the temperature detecting resistors 3, 4, 7 and 8 are formed in the same film thickness and line width as those in the known art, the resistance value of the temperature detecting resistors 3, 4, 7 and 8 becomes small.

In this embodiment of the present invention, therefore, for the purpose of obtaining the resistance value of the temperature detecting resistors 3, 4, 7 and 8 not smaller than 5 kΩ, the temperature detecting resistors 3, 4, 7 and 8 are each formed of a thin film having a film thickness of not more than 0.1 μm and a line width of not more than 1 μm when those resistors are made of platinum or a nickel alloy. Also, when using a polysilicon thin film, the temperature detecting resistors 3, 4, 7 and 8 are each formed of a thin film having a film thickness of not more than 0.5 μm and a line width of not more than 4 μm. From the viewpoints of process efficiency and variations, the polysilicon thin film is more advantageous in practical use.

Thus, according to the first embodiment of the present invention, since the resistance value of the temperature detecting resistors 3, 4, 7 and 8 is set to a large value (5 kΩ to 500 kΩ) to suppress the amount of heat generated by the temperature detecting resistors 3, 4, 7 and 8, the output value is prevented from varying to a large extent depending on the power source voltage, and a stable output value can be obtained even in spite of using the ECU power source as a power source for the flow rate measuring apparatus.

Consequently, a heating resistance flow rate measuring apparatus capable of using, as a power source, the ECU power source produced in an automobile can be realized without requiring an expensive protective circuit and regulator.

Further, the inventors have clarified that, when the ECU power source is employed as the power source for the heating resistance flow rate measuring apparatus, the resistance temperature coefficient of the heating resistor is a very important factor. This point will be described below.

Hitherto, it has been commonsense in the art that the resistance temperature coefficient of the heating resistor 6 is preferably as large as possible from the viewpoint of measuring the temperature of the heating resistor 6 based on a change in the resistance value of the heating resistor 6. For that reason, a material having a large resistance temperature coefficient of 4000 ppm/° C., such as platinum or a nickel alloy, has been used to form the heating resistor 6.

According to the studies made by the inventors, however, it has been found that, when the driving circuit 34 receives the power source supplied from the ECU, the resistance temperature coefficient of the heating resistor 6 should be not more than about 2000 ppm/° C.

FIG. 7 is a graph showing the relationship of the resistance value of the heating resistor 6 versus the current and the voltage which are required for causing the heating resistor 6 to generate heat of 45 mW. Assuming here that the current of the power source supplied from the ECU is limited 10 mA and the voltage thereof is limited to 5 V, the allowable variation range for the resistance value of the heating resistor 6 is 450 Ω to 550 Ω.

In the case of the resistance temperature coefficient being as high as 4000 ppm/° C. like platinum or a nickel alloy, however, when the ambient temperature changes 100° C., the resistance value of the heating resistor 6 is changed 40% with such a change in the ambient temperature alone.

Supposing that the resistance value of the heating resistor 6 is 500 Ω at 25° C., the resistance value of the heating resistor 6 at 125° C. is 700 Ω. In this case, because the voltage is limited to 5 V, the power capable of being supplied to the heating resistor 6 is just 36 mW, whereby the temperature of the heating resistor 6 lowers and the characteristics of the heating resistance flow rate measuring apparatus are significantly changed.

To enlarge the allowable range of the resistance variation, therefore, it is required to form the heating resistor 6 in smaller size and to reduce the power required for the heating resistor 6.

FIG. 8 is a graph showing the relationship of the resistance value of the heating resistor 6 versus the current and the voltage which are required for causing the heating resistor 6 to generate heat of 40 mW. As seen from FIG. 8, by reducing the amount of heat generated by the heating resistor 6 to 40 mW, the allowable range of the resistance variation spans from 400 Ω to 620 Ω; namely the resistance variation allowable range of the heating resistor 6 is enlarged.

That relationship is plotted in FIG. 9. Specifically, FIG. 9 is a graph showing the relationship between the amount of heat generated by the heating resistor 6 and a resistance variation allowable value (%) of the heating resistor 6. As seen from FIG. 9, too, the resistance variation allowable value of the heating resistor 6 can be increased by reducing the amount of heat generated by the heating resistor 6.

However, it is generally known that reducing the amount of heat generated by the heating resistor 6 makes the heating resistor 6 more susceptible to contamination. This is because even when water or oil is attached to the heating resistor 6, the attached water or oil can be evaporated if the amount of heat generated by the heating resistor 6 is large. Stated another way, if the amount of heat generated by the heating resistor 6 is small, the attached water or oil cannot be evaporated and the heating resistor 6 is more susceptible to contamination.

From that reason, the amount of heat generated by the heating resistor 6 is preferably as large as possible from the viewpoint of protection against contamination.

FIG. 10 is a graph showing the relationship between the resistance temperature coefficient of the heating resistor 6 and the amount of heat generated by the heating resistor 6 in consideration of a resistance variation width of the heating resistor 6 resulting from a change in the resistance temperature of the heating resistor 6. As is apparent from FIG. 10, as the resistance temperature coefficient of the heating resistor 6 increases, the resistance variation of the heating resistor 6 is increased and the amount of heat generated by the heating resistor 6 is reduced.

Then, in order to suppress the amount of heat generated by the heating resistor 6 within the allowable range, the resistance temperature coefficient of the heating resistor 6 is required to be at least 2000 ppm/° C. or less.

In the first embodiment of the present invention, therefore, the composition of a platinum or nickel alloy, i.e., a material of the heating resistor 6, is modified so as to reduce the resistance temperature coefficient of the heating resistor 6. Also, when a polysilicon this film is used as the material of the heating resistor 6, the thin film is subjected to doping at such a high density that the resistance temperature coefficient of 2000 ppm/° C. is obtained.

On the other hand, if the resistance temperature coefficient of the heating resistor 6 were too small, it would be difficult to detect the temperature in a reliable manner. Therefore, the resistance temperature coefficient is required to be at least 1000 ppm/° C. or more.

The construction of the heating resistor 6 and the temperature detecting resistors 3, 4, 7 and 8 will be described below with reference to FIG. 11.

In FIG. 11, the heating resistor 6 is formed in small area so that it can be heated to high temperature with a relatively small amount of heat generated. Practically, the area of the heating resistor 6 is required to be not larger than 0.1 mm². In this embodiment of the present invention, the heating resistor 6 is designed in area of 500 µm×200 µm.

Also, slits 43, 44, 45, 46, 47 and 48 are formed in the heating resistor 6 to provide a resistance value at which maximum efficiency is achieved when the driving circuit 34 receives the power source supplied from the ECU. Stated another way, the heating resistor 6 is made up of a plurality of strip-shaped resistors for optimum adjustment of the resistance value thereof.

Further, forming the heating resistor 6 to be made up of a plurality of strip-shaped resistors contributes to eliminating unevenness in temperature of the heating resistor 6. If the heating resistor 6 were in the form of a single strip, the temperature of the heating resistor 6 is distributed such that the temperature in a central portion is relatively high and the temperature in a peripheral portion is relatively low.

With the heating resistor 6 being made up of a plurality of strip-shaped resistors as shown in FIG. 11, when the temperature in the central portion of the heating resistor 6 is going to rise, the resistance value of the strip-shaped resistor in the central portion is increased so as to reduce the amount of heat generated. On the other hand, when the temperature in the peripheral portion of the heating resistor 6 is going to lower, the resistance value of the strip-shaped resistor in the peripheral portion is reduced so as to increase the amount of heat generated. As a result, the temperature of the heating resistor 6 can be kept uniform.

The resistance value of the heating resistor 6 at which maximum efficiency is achieved when the driving circuit 34 receives the power source supplied from the ECU is given as a value resulting from dividing the minimum operation assurance voltage of the power source supplied to the heating resistance flow rate measuring apparatus by the maximum allowable current of the power source supplied to the heating resistance flow rate measuring apparatus. When the heating resistance flow rate measuring apparatus is supplied with the power source from the ECU, the aforesaid resistance value is 450 Ω on condition that the minimum operation assurance voltage is 4.5 V and the maximum allowable current is 10 mA.

Accordingly, a total of the resistance value of the heating resistor 6 and the resistance value of wired lines for the heating resistor 6 is preferably set to be about 450 Ω±20%, taking into account process variations. Note that the above total resistance value represents a value when the heating resistor 6 is in a heated state.

While the heating resistor 6 and the temperature detecting resistors 3, 4, 7 and 8 are set so as to have the resistance temperature coefficient and the resistance values described above, it is preferable to confirm whether the resistance temperature coefficient and the resistance values satisfy the respective setting values or not after those resistors have been actually formed in the driving circuit 34.

Methods for measuring the resistance temperature coefficient of the heating resistor 6 and the resistance value of the temperature detecting resistors 3, 4, 7 and 8 will be described below with reference to FIG. 12.

FIG. 12 is a circuit diagram of the heating resistance flow rate measuring apparatus. As shown, the heating resistor 6 and the temperature measuring resistor 10 are connected in series, and the wiring including these resistors 6, 10 is led out to the exterior through the pads 15, 16 and 17. Also, the wiring including the temperature detecting resistors 3, 4, 7 and 8 is led out to the exterior through the pads 11, 12, 13, 14, 18, 19, 20 and 21.

The method of measuring the resistance temperature coefficient of the heating resistor 6 is first described.

A measuring circuit is formed by connecting a voltage source 50 and an ammeter 49, which are connected in series, between the pad 15 connected to one end of the heating resistor 6 and the pad 17 connected to the other end of the heating resistor 6.

Then, a current is supplied from the voltage source 50 to the heating resistor 6 for heating the heating resistor 6 to a predetermined temperature, and a value of the ammeter 49 at each of the ambient temperatures of 25° C. and 85° C. is detected.

As a result, a total resistance value of the heating resistor 6 and wired leads for the heating resistor 6 at each of the ambient temperatures of 25° C. and 85° C. is measured. From this measured total resistance value, the resistance temperature coefficient of the heating resistor 6 is calculated.

The method of measuring the resistance value of the temperature detecting resistors 3, 4, 7 and 8 is next described.

A measuring circuit is formed by connecting the pad 11 connected to one end of the resistor 3 and the pad 18 connected to one end of the resistor 7 to each other, connecting the pad 14 connected to the other end of the resistor 3 and the pad 19 connected to one end of the resistor 8 to each other, connecting the pad 21 connected to the other end of the resistor 7 and the pad 12 connected to one end of the resistor 4 to each other, and connecting the pad 20 connected to the other end of the resistor 8 and the pad 13 connected to the other end of the resistor 4 to each other. A bridge circuit made up of the temperature detecting resistors 3, 4, 7 and 8 is thereby constructed.

A voltage source 52 and an ammeter 51, which are connected in series, are connected between the junction of the pads 11, 18 and the junction of the pads 13, 20. The voltage source 52 is set to 5 V, and a value of the ammeter 51 at the ambient temperature of 25° C. is read. Then, the resistance value of the temperature detecting resistors 3, 4, 7 and 8 is calculated from the value of the ammeter 51.

The arrangement of a driving circuit of a heating resistance flow rate measuring apparatus according to a second embodiment of the present invention will be described below with reference to FIG. 13.

Figure 13:
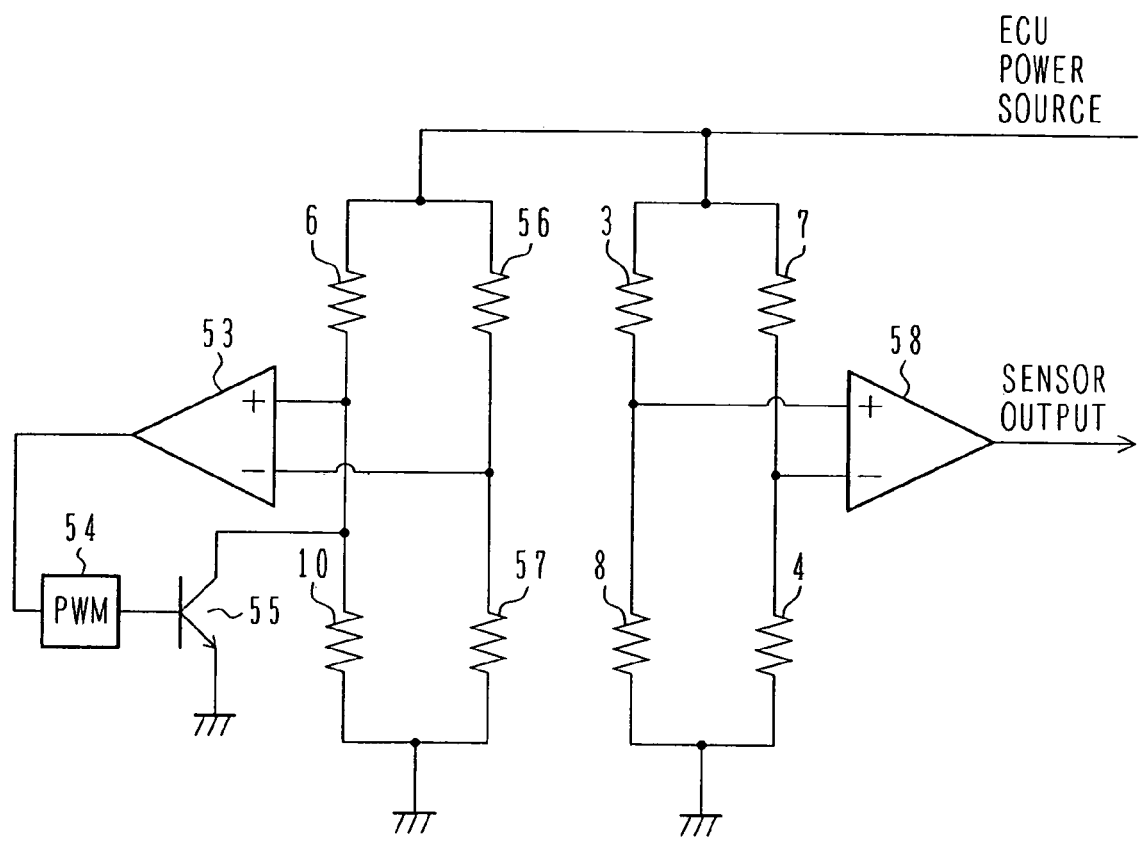
FIG. 13 is a diagram of a driving circuit of a heating resistance flow rate measuring apparatus according to a second embodiment of the present invention.

As shown in FIG. 13, the driving circuit in the second embodiment receives the power source supplied from the ECU, and it comprises the heating resistor 6 and the temperature measuring resistor 10 both disposed within the sensor element 1, a driving transistor 55 for energizing the heating resistor 6, resistances 56, 57 connected in parallel to a circuit made up of the heating resistor 6 and the temperature measuring resistor 10 connected in series, an amplifier 53 for amplifying an error voltage of a bridge circuit made of the heating resistor 6, the temperature measuring resistor 10, and the resistances 56, 57, and a PWM circuit 54 for generating a pulse modulation signal from an output of the amplifier 53 and energizing the driving transistor 55.

The driving circuit in the second embodiment further comprises an amplifier 58 for amplifying an output voltage of a bridge circuit made up of the temperature detecting resistors 3, 4, 7 and 8 to generate a sensor output.

The driving circuit in the second embodiment has an arrangement common to the driving circuit in the first embodiment, and the resistance value of the temperature detecting resistors 3, 4, 7 and 8 is in the range of 5 kΩ to 500 kΩ. The difference between the first and second embodiments resides in a method for energizing the heating resistor 6.

More specifically, in the second embodiment of the present invention, the temperature of the heating resistor 6 is controlled by performing on/off control of the driving transistor 55 in accordance with the pulse modulation signal from the PWM circuit 54.

In the driving circuit shown in FIG. 13, therefore, the resistance value of the temperature measuring resistor 10 is set larger than that of the heating resistor 6 so that there occurs a difference between the amount of heat generated by the heating resistor 6 and the amount of heat generated by the temperature measuring resistor 10 with the on/off control of the driving transistor 55.

The second embodiment can also provide similar advantages to those obtained with the first embodiment.

Figure 14:
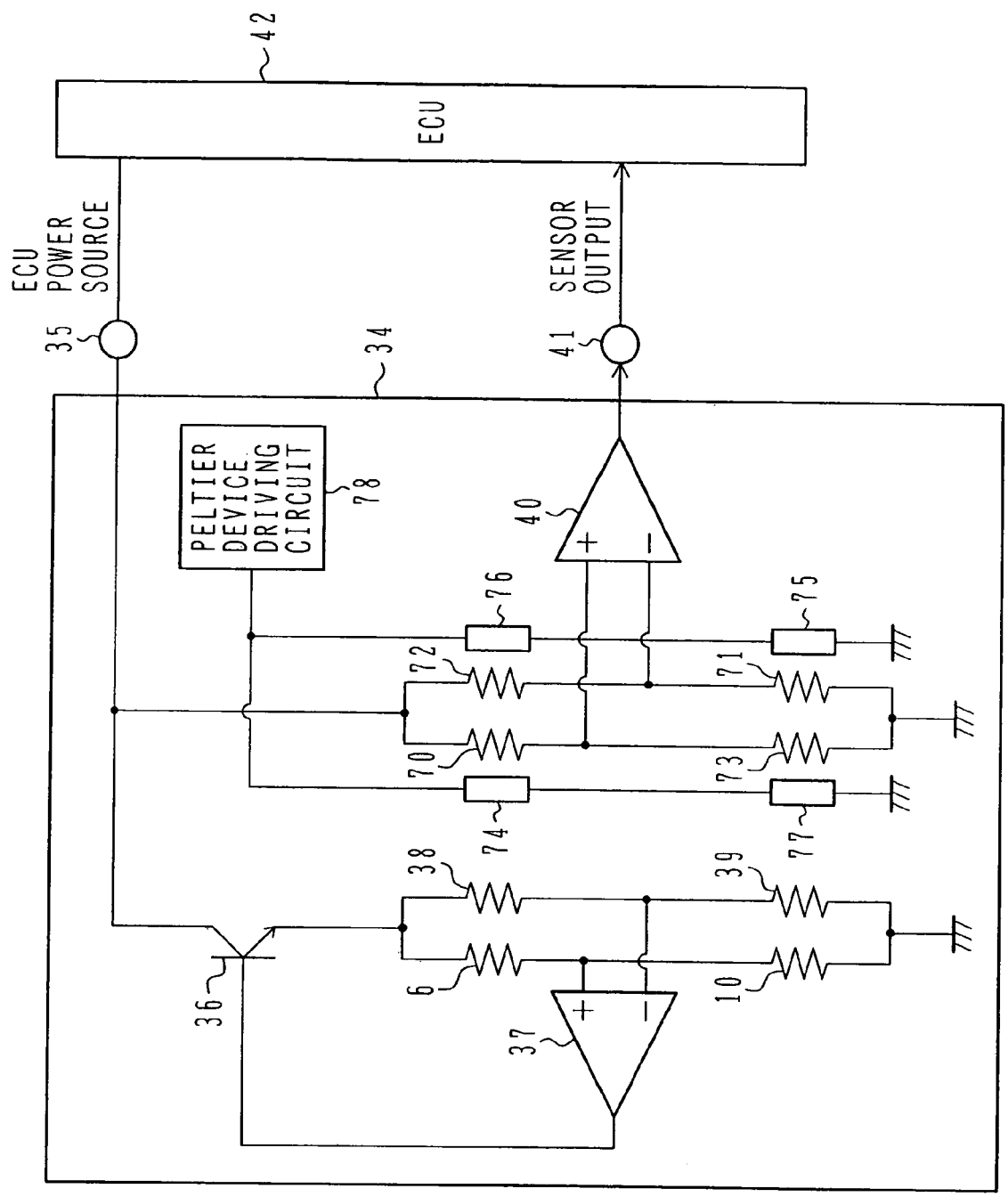
FIG. 14 is a diagram of a driving circuit of a heating resistance flow rate measuring apparatus according to a third embodiment of the present invention.

A third embodiment of the present invention will be described below with reference to FIG. 14.

In the above-described first embodiment of the present invention, the resistance value of the temperature detecting resistors 3, 4, 7 and 8 is set to a high value (not less than 5 kΩ) for the purpose of suppressing the amount of heat generated by the temperature detecting resistors 3, 4, 7 and 8. On the other hand, the resistance value of temperature detecting resistors 70, 71, 72 and 73 in this third embodiment is set to a low value of less than 5 kΩ instead of a high value, and Peltier devices 74, 75, 76 and 77 are disposed respectively near the temperature detecting resistors 70 to 73 as means for suppressing temperature rise of the resistors 70 to 73. The Peltier devices 74, 75, 76 and 77 are driven by a Peltier device driving circuit 78 so that the temperature detecting resistors 70 to 73 are held at appropriate temperatures.

The remaining arrangement of the third embodiment is the same as that of the first embodiment.

Since the Peltier devices and the driving circuit for the Peltier devices are inexpensive as compared with the protective circuit 25 and the regulator 28 shown in FIG. 17, the third embodiment of the present invention can also provide similar advantages to those obtained with the first embodiment.

Figure 15:
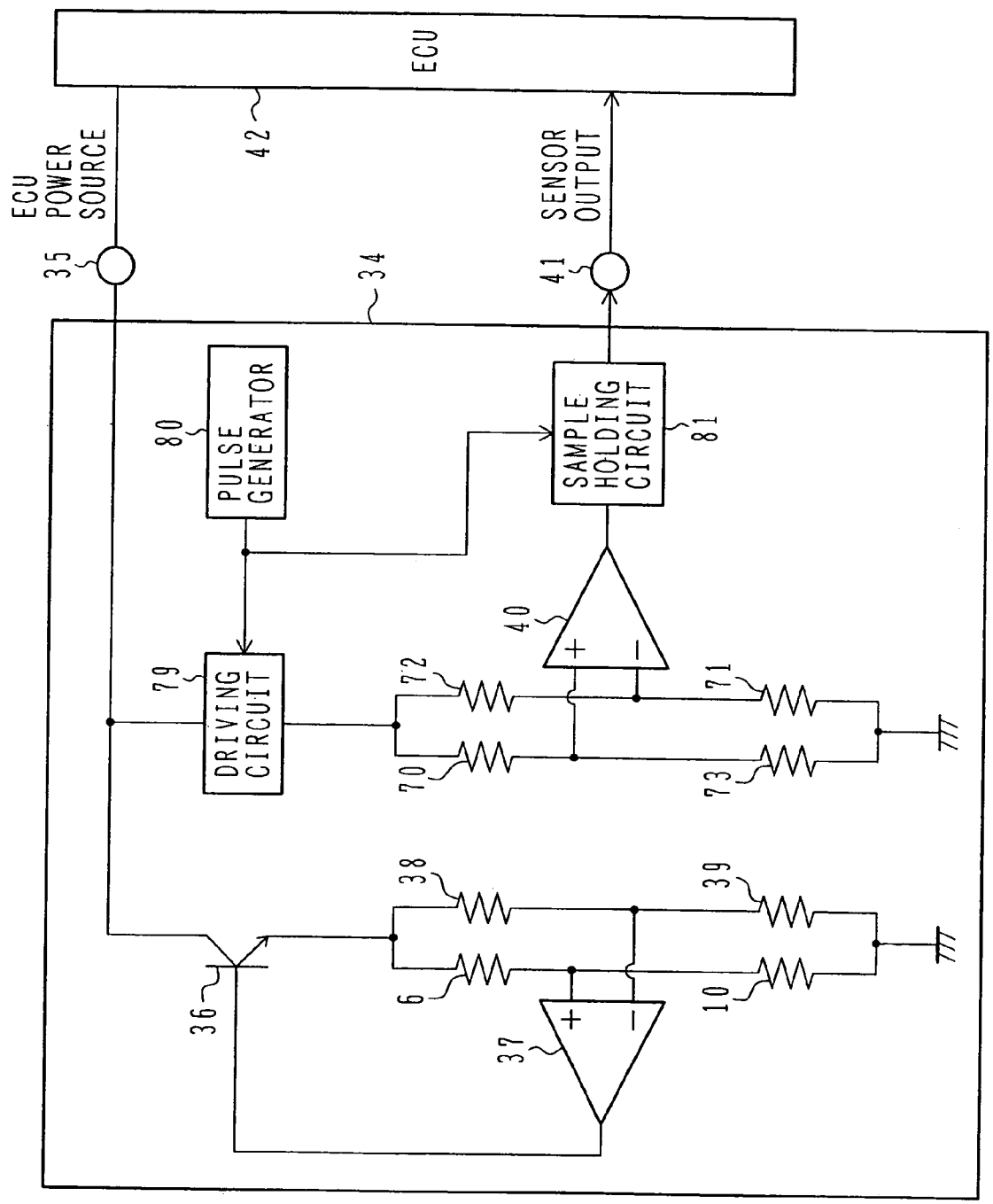
FIG. 15 is a diagram of a driving circuit of a heating resistance flow rate measuring apparatus according to a fourth embodiment of the present invention.

A fourth embodiment of the present invention will be described below with reference to FIG. 15.

In this fourth embodiment, as in the third embodiment, the resistance value of the temperature detecting resistors 70, 71, 72 and 73 is set to a low value of less than 5 kΩ instead of a high value, and a circuit for controlling an applied current value is disposed as means for suppressing temperature rise of the resistors 70 to 73. More specifically, a driving circuit 79 capable of being subjected to on/off control, such as a transistor, is connected to the bridge circuit made up of the temperature detecting resistors 70 to 73, and energization of the driving circuit 79 is controlled in accordance with a pulse signal from a pulse generator 80.

Then, an output signal of the amplifier 40 is supplied to a sensor output terminal 41 through a sample hold circuit 81. The sample hold circuit 81 sample-holds and outputs the signal supplied to it in accordance with the pulse signal from a pulse generator 80.

The remaining arrangement of the fourth embodiment is the same as that of the first embodiment.

Since the driving circuit 79, the pulse generator 80, and the sample hold circuit 81 are inexpensive as compared with the protective circuit 25 and the regulator 28 shown in FIG. 17, the fourth embodiment of the present invention can also provide similar advantages to those obtained with the first embodiment. Note that the driving circuit 79, the pulse generator 80, and the sample hold circuit 81 jointly constitutes current intermittent supply means for the temperature detecting resistors.

The arrangement of principal components of an operation control unit for, e.g., an automobile, in which the heating resistance flow rate measuring apparatus according to any of the first to fourth embodiments of the present invention is employed, will be described below with reference to FIG. 16.

Figure 16:
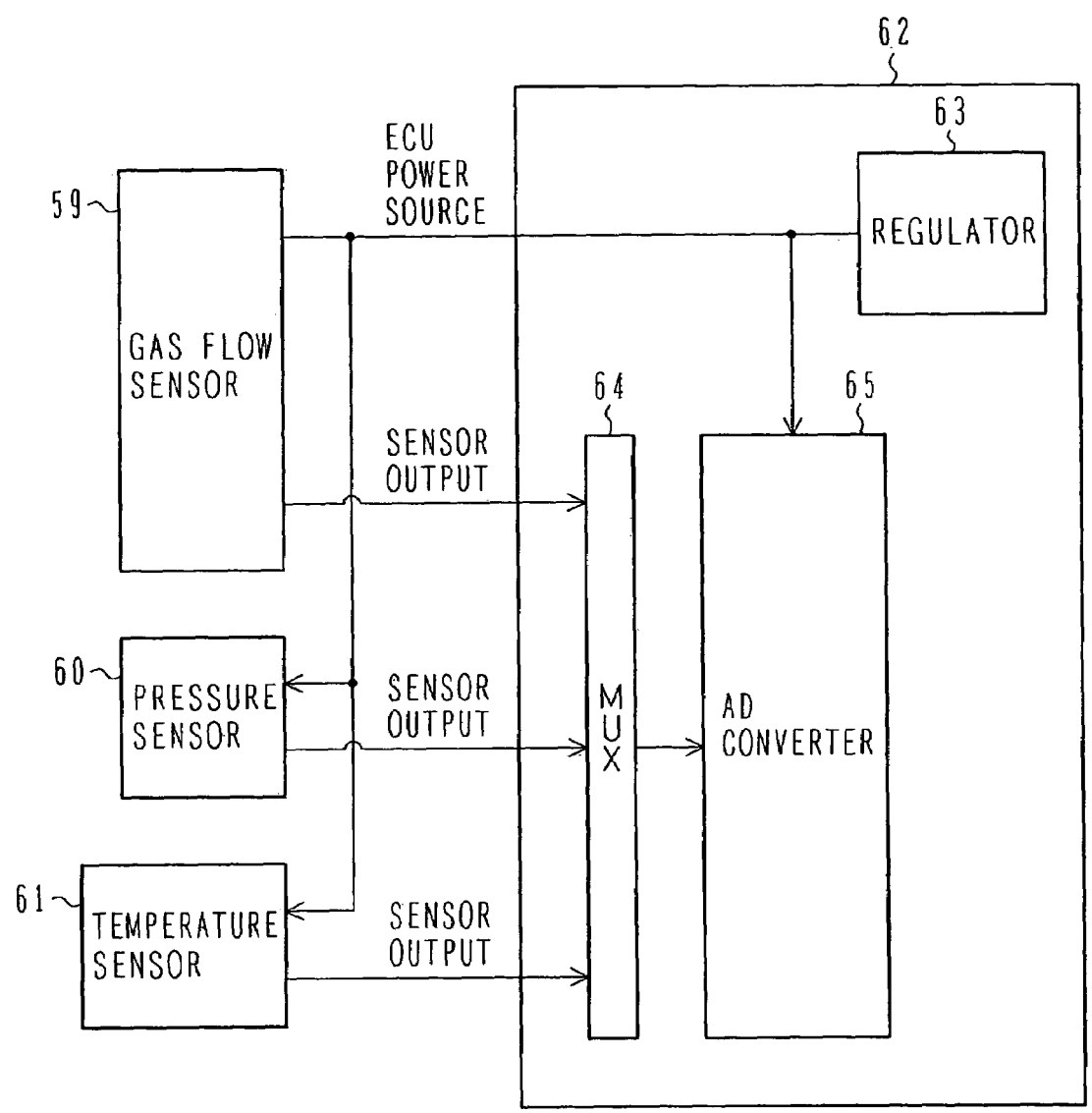
FIG. 16 is a block diagram of principal components of an operation control unit in which the heating resistance flow rate measuring apparatus according to any of the embodiments of the present invention is employed.

As shown in FIG. 16, a control unit 62 comprises a heating resistance flow rate measuring apparatus (gas flow sensor) 59, a pressure senor 60, a temperature sensor 61, a regulator 63 for supplying reference power to the temperature sensor 61, a multiplexer 64 for switching over outputs of the heating resistance flow rate measuring apparatus 59, the pressure senor 60 and the temperature sensor 61 from one to another, and an AD converter 65 converting an analog signal selected by the multiplexer 64 into a digital signal.

In the control unit 62, a reference voltage for the AD converter 65 is also applied from the regulator 63. By setting the sensor outputs of the heating resistance flow rate measuring apparatus 59, the pressure senor 60 and the temperature sensor 61 to be changed in proportion to the output voltage of the regulator 63 in the control unit 62, therefore, the converted output of the AD converter 65 is also changed in proportion to the output voltage of the regulator 63.

Accordingly, the sensor outputs of the heating resistance flow rate measuring apparatus 59, the pressure senor 60 and the temperature sensor 61 can be precisely measured regardless of a variation in the output voltage of the regulator 63.

What is claimed is:

1. A heating resistance flow rate measuring apparatus for outputting an output voltage corresponding to measured flow rate, comprising: a heating resistor; and temperature detecting resistors, wherein a resistance value of said temperature detecting resistor is 5 kΩ to 500 kΩ, said output voltage is substantially proportional to a voltage value of power source supplied to said heating resistance flow rate measuring apparatus.

2. A heating resistance flow rate measuring apparatus according to claim 1, wherein said heating resistor and said temperature detecting resistor are formed on a silicon substrate, and said temperature detecting resistors are arranged respectively upstream side and downstream side of said heating resistor.

3. A heating resistance flow rate measuring apparatus according to claim 1, wherein a Peltier device for cooling said temperature detecting resistor is arranged near each of said temperature detecting resistors.

4. A heating resistance flow rate measuring apparatus according to claim 1 further comprising means for intermittently supplying a current to said temperature detecting resistors.

5. A heating resistance flow rate measuring apparatus according to claim 1, wherein said temperature detecting resistor is made of platinum, nickel alloy, or polysilicon.

6. A heating resistance flow rate measuring apparatus for outputting an output voltage to an engine control apparatus, comprising: a heating circuit for heating a resistor; and a bridge circuit including temperature detecting resistor having resistance value of 5 kΩ to 500 kΩ, wherein a power supply voltage of said bridge circuit is supplied from said engine control apparatus.

7. A heating resistance flow rate measuring apparatus according to claim 6, wherein said heating resistor and said temperature detecting resistor are formed on a silicon substrate, and said temperature detecting resistors are arranged respectively upstream side and downstream side of said heating resistor.

8. A heating resistance flow rate measuring apparatus according to claim 6, wherein a Peltier device for cooling said temperature detecting resistor is arranged near each of said temperature detecting resistors.

9. A heating resistance flow rate measuring apparatus according to claim 6 further comprising means for intermittently supplying a current to said temperature detecting resistors.

10. A heating resistance flow rate measuring apparatus according to claim 6, wherein said temperature detecting resistor is made of platinum, nickel alloy, or polysilicon.

* * * * *

UNITED STATES PATENT AND TRADEMARK OFFICE
CERTIFICATE OF CORRECTION

| | | |
|---|---|---|
| PATENT NO. | : 7,225,669 B2 | Page 1 of 1 |
| APPLICATION NO. | : 11/283778 | |
| DATED | : June 5, 2007 | |
| INVENTOR(S) | : Matsumoto et al. | |

It is certified that error appears in the above-identified patent and that said Letters Patent is hereby corrected as shown below:

Title page, item [75] City of residence for each of the inventors is as follows:
        Masahiro Matsumoto, Hitachi (JP)
        Masamichi Yamada, Hitachinaka (JP)
        Hiroshi Nakano, Hitachi (JP)
        Izumi Watanabe, Hitachinaka (JP)
        Keiji Hanzawa, Mito (JP)
        Keiichi Nakada, Hitachinaka (JP)

Signed and Sealed this

Twenty-first Day of August, 2007

JON W. DUDAS
*Director of the United States Patent and Trademark Office*